(12) United States Patent
Burgess

(10) Patent No.: US 6,637,830 B1
(45) Date of Patent: Oct. 28, 2003

(54) SPINABLE WHEEL COVER

(76) Inventor: Walter Burgess, P.O. Box 5293, Largo, FL (US) 33779

( * ) Notice: Subject to any disclaimer, the term of this patent is extended or adjusted under 35 U.S.C. 154(b) by 0 days.

(21) Appl. No.: 10/172,711

(22) Filed: Jun. 17, 2002

(51) Int. Cl.[7] .................................................. B60B 7/20
(52) U.S. Cl. ................................ 301/37.25; 301/37.109
(58) Field of Search .......................... 301/37.25, 37.101, 301/37.102, 37.21, 37.26, 37.38, 37.108, 37.109, 108.1, 108.4, 108.5

(56) References Cited

U.S. PATENT DOCUMENTS

| | | |
|---|---|---|
| 1,739,577 A | 12/1929 | Cantel |
| 2,130,220 A | 9/1938 | Ball |
| 2,869,262 A | 1/1959 | Lucas |
| 3,078,124 A | 2/1963 | Mulder |
| 3,155,430 A * | 11/1964 | Schindler ................. 301/37.25 |
| 3,158,946 A | 12/1964 | Upchurch |
| 3,219,391 A | 11/1965 | Hettinger |
| 3,722,958 A | 3/1973 | Marshall |
| 4,214,683 A | 7/1980 | Wills |
| 4,280,293 A | 7/1981 | Kovalenko |
| 4,929,030 A | 5/1990 | Park |
| 4,981,329 A | 1/1991 | Koch et al. |
| 5,290,094 A | 3/1994 | Gragg |
| 5,490,342 A | 2/1996 | Rutterman |
| 5,588,715 A | 12/1996 | Harlen |
| 5,623,777 A | 4/1997 | Hsiao |
| 5,957,542 A | 9/1999 | Boothe |
| 6,045,195 A | 4/2000 | Okamoto |
| 6,048,036 A | 4/2000 | Alaoui |
| 6,120,104 A | 9/2000 | Okamoto |

* cited by examiner

Primary Examiner—Russell D. Stormer

(57) ABSTRACT

A wheel cover for a vehicle wheel with a sprag clutch providing the connection to the cover so that the cover can overrun the wheel. A second clutch of the centrifugal type connects the sprag clutch to the vehicle wheel so that at elevated speeds the cover is not driven by the wheel.

4 Claims, 3 Drawing Sheets

SPINABLE WHEEL COVER

BACKGROUND OF THE INVENTION

1) Field of the Invention

This invention relates to wheel covers for the wheels of motor vehicles generally and more particularly to such a cover as is mounted on a wheel so as to be able to spin independently relative to the wheel in certain modes of operation while rotating unitarily with the wheel during other modes of operation.

2) Description of the Prior Art

Spinable and/or non-rotating wheel covers are well known in the art as exemplified by U.S. Pat. Nos. 3,219,391; 4,929,030; 5,957,542; and 5,490,342. U.S. Pat. No. 3,219,391 in particular shows and describes a wheel cover mounted on a wheel so as to rotate independently relative to the wheel whereby the cover can continue to revolve for at least a short time after the vehicle has come to rest. None of the devices which are the subject matter of these patents relate to a wheel cover which is clutchedly connected to the wheel for unitary rotation when the vehicle is traveling in a forward direction yet when the vehicle stops or travels in reverse is unconnected so as to be able to revolve independently in a forward direction. Additionally, if connected for unitary rotation, do not include a second device for disconnecting the cover from a driving connection at rotational speed above a selected speed so that the cover can again rotate relative to the wheel.

SUMMARY OF THE INVENTION

The present invention relates to a wheel cover which is mounted on the wheel of a vehicle by a one way sprag (overrunning) clutch so that when the wheel is rotating in a forward direction, the sprags are locked and the cover is connected to the wheel for unitary rotation, since the inner race of the sprag clutch is connected to the wheel for unitary rotation and the outer race of the clutch is connected to the cover for unitary rotation. When the wheel stops, or rotates in a reverse direction, the wheel cover is free to rotate in the forward direction since the sprag clutch will be unlocked. In one embodiment, the inner race of the sprag clutch is mounted on the wheel by a complement of bearings and drivingly connected to the wheel for unitary rotation by a speed sensitive clutch means such as a centrifugal clutch, which latter clutch disconnects the connection of the inner race to the wheel at some preselected rotational velocity of the wheel, and thus at rotational speeds above the selected speed, the inner race of the sprag clutch is free to rotate relative to the wheel and the wheel cover can rotate relative to the wheel even though the sprag clutch may be engaged at such time.

DETAILED DESCRIPTION OF THE PREFERRED EMBODIMENT

Figure 1:
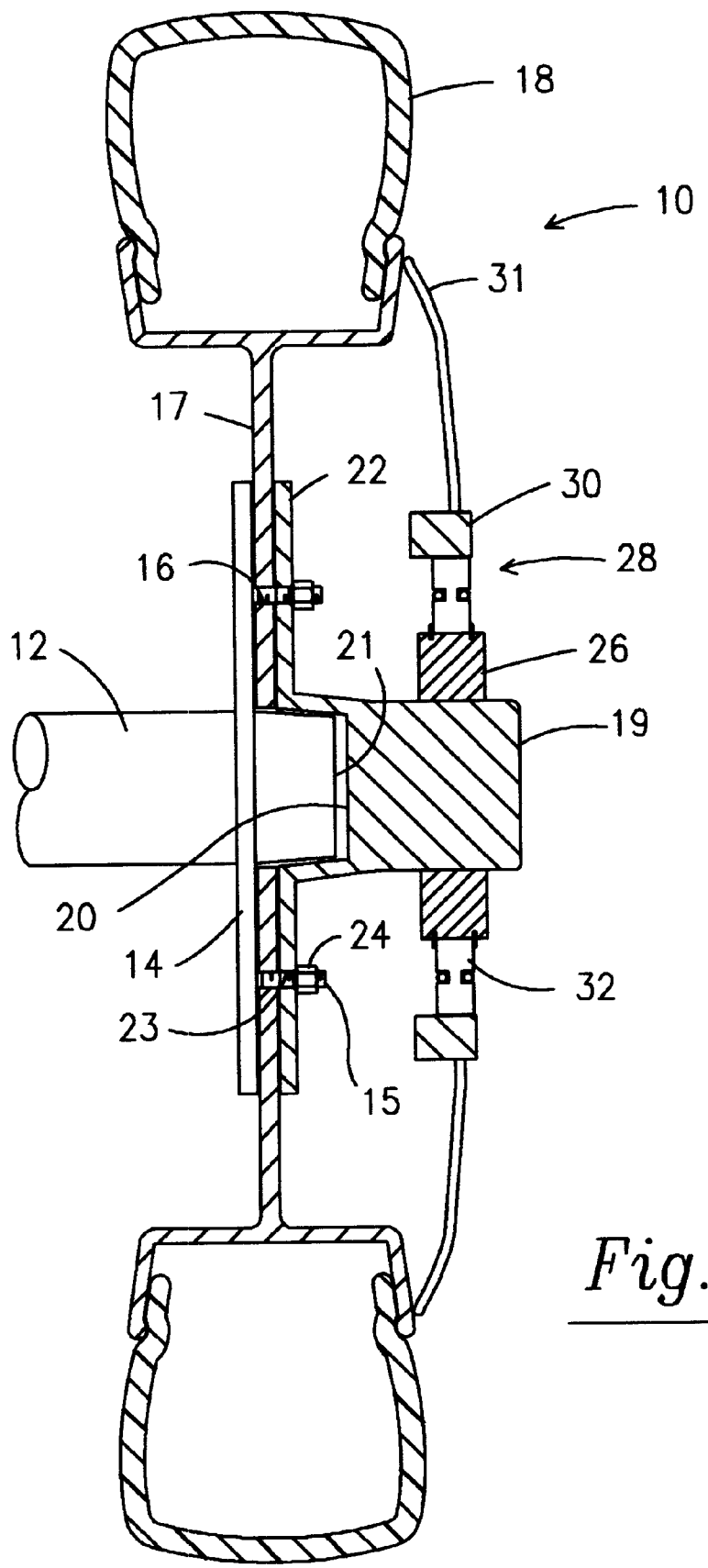
FIG. 1 is a side elevational view in cross section of a wheel with a tire mounted thereon and a spinable wheel cover of this invention mounted on the wheel.

Referring now to the drawings, and more particularly to FIG. 1, a wheel and wheel cover assembly is shown generally at 10 conventionally mounted on an outboard end of a driving axle 12. The hub flange 14 of the axle 12 includes a plurality of circumferentially spaced lugs 15, which lugs pass through registering openings 16 in a wheel 17, the latter having a conventional tire 18 mounted thereon. A wheel cover hub 19 has a central opening 20 therein which pilotingly receives the outboard end 21 of the axle 12, which hub has a n integral flange 22 thereon with the latter having a plurality of openings 23 in registration with and receiving the studs 15, while a nut 24 is threaded on each stud 15 to thereby secure the wheel 17 and the cover hub 19 to the axle 12 for unitary rotation.

Mounted on the hub 19 in a pressed fit relationship for unitary rotation is the inner race 26 of a sprag clutch shown generally at 28, which sprag clutch has an outer race 30 conventionally spaced from the inner race 26 and having a wheel cover 31 secured thereon for unitary rotation with the periphery of the cover being rotatably spaced from the wheel 17. A conventional plurality of sprag members 32 is disposed between the races 26 and 30 in a conventional manner. A annularly disposed sprag clutch coiled compression spring 34, as best seen in FIG. 3, engages the sprag members 32 and urges them into an upright condition whereby they are resiliently biased into a wedging relationship with the inner and outer races 28 and 30 and are drivingly disposed between the inner and outer races when the axle 19 and the wheel 17 are driving forward (clockwise as seen in the direction of the arrow A shown in FIG. 3) to thereby drive the wheel cover 31, and are overridingly disposed between the inner and outer races when the hub 19 stops rotating or rotates in a reverse direction and the wheel cover 31 can continue to rotate in the direction of the arrow A uninhibited by the sprag clutch 28 since the latter will become disengaged at such time and acts as a rotative connection in the manner of a bearing which provides support while allowing relative rotation.

Figure 2:
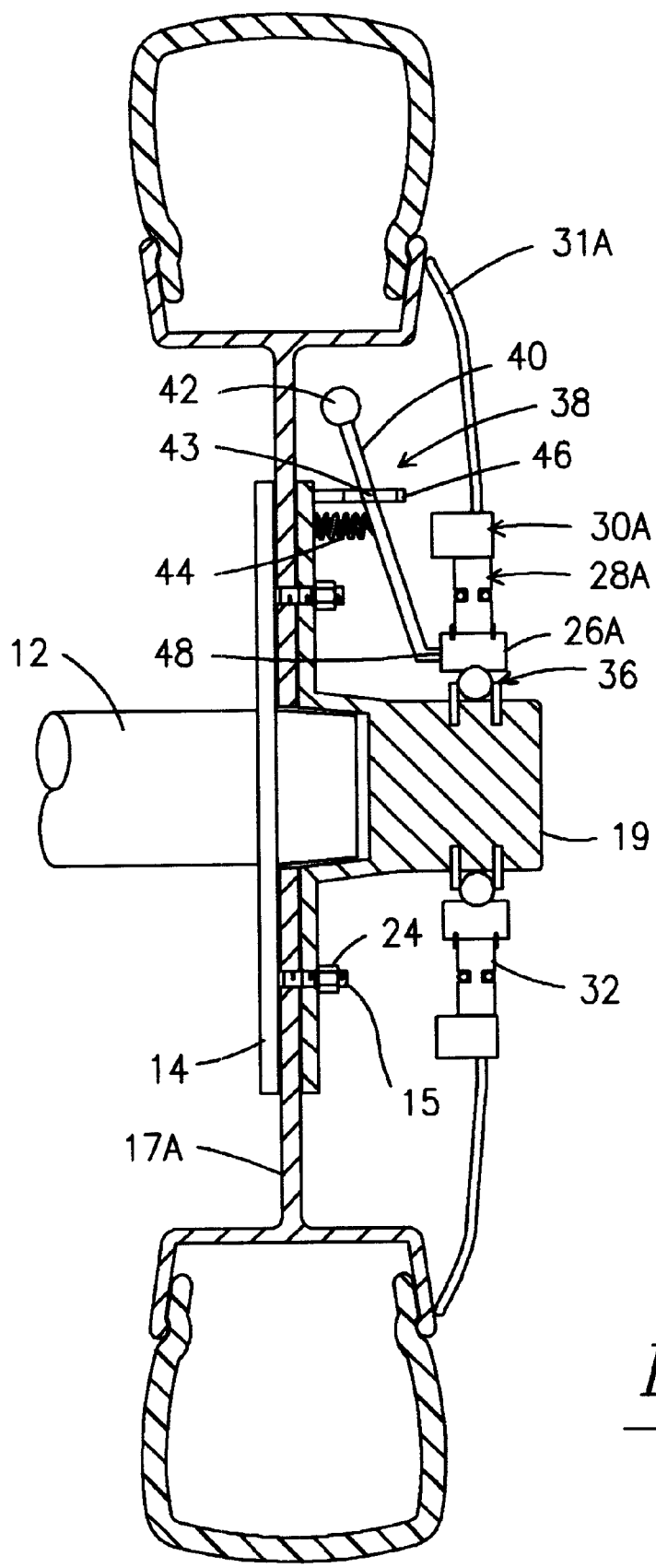
FIG. 2 is a view taken like FIG. 1 of a second embodiment of this invention.
Figure 3:
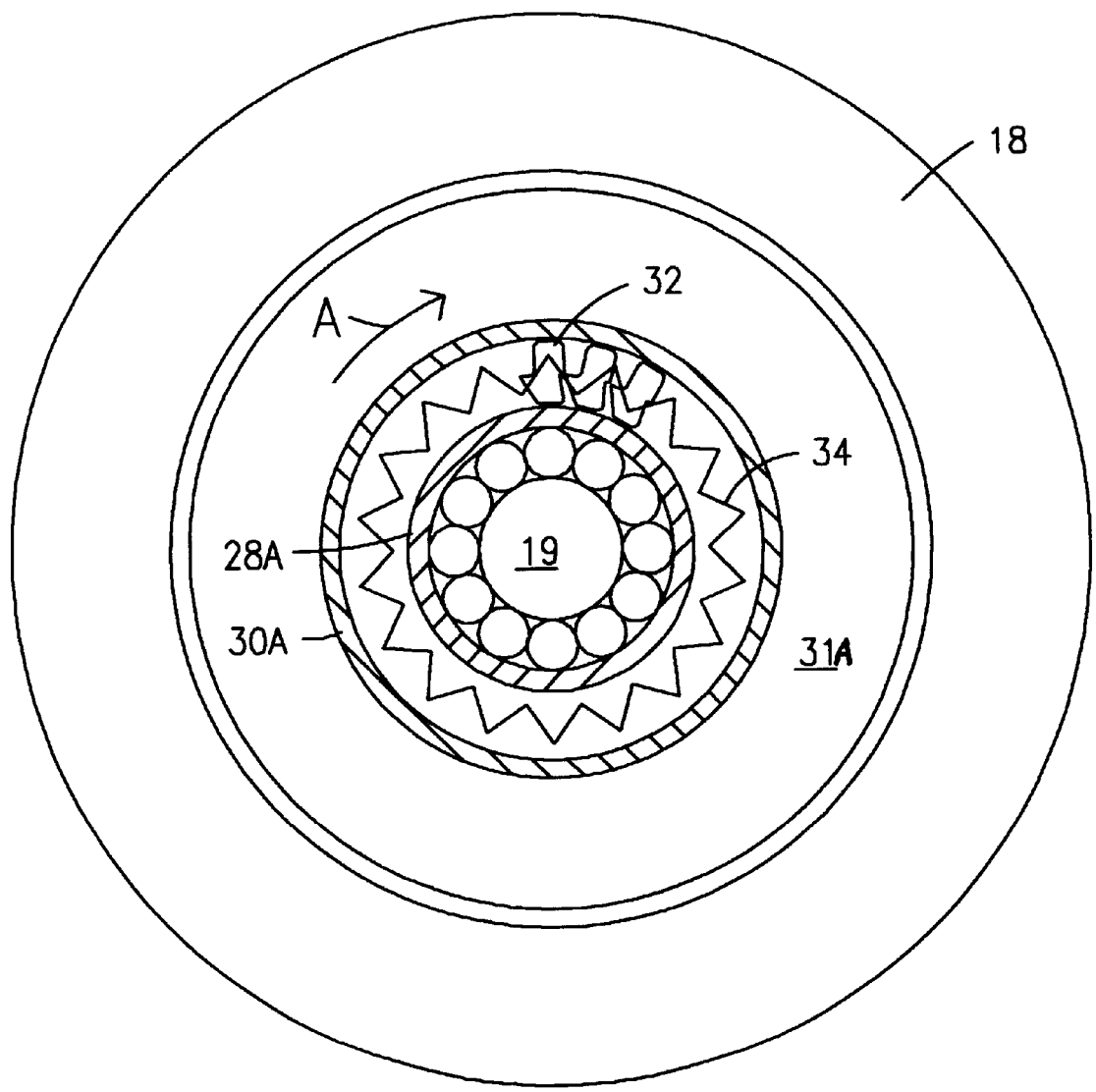
FIG. 3 is a front elevational view of the assembly shown in FIG. 2, with the sprag clutch shown in section.

Referring now to FIGS. 2 and 3, a second embodiment of this invention is shown with a sprag clutch 28A having inner and outer races 26A and 30A, and with the inner race 26A being rotatably mounted on the hub 19 by a roller bearing assembly shown generally at 36. A speed activated clutch means in the form of a centrifugal clutch is shown generally at 38 and includes a lever 40 with a weight 42 on the radially outer end thereof, with the lever being pivotally mounted by a pivot pin 43 to a support member 46; the latter being securely carried by the hub 19. A compression spring 44 biases the lever to rotate in a counterclockwise direction, as seen in FIG. 2, so that a clutching surface 48 on the radially inner end thereof engages the inner race 26A of the sprag clutch 28A, whereby when stationary and at lower speeds the clutch 38 connects the inner race to the hub 19 and the assembly operates as described for the embodiment of FIG. 1. However, at higher speeds the weight 42 of the centrifugal clutch 38 will cause the lever 40 to rotate clockwise, as seen in FIG. 2, so that the clutching surface 48 will move out of engagement with the inner race 26A and the sprag clutch, and the wheel cover 31A carried thereby will be free to rotate relative to the hub 19 and the wheel 17A carried thereby until such time as the speed of the wheel drops below the speed set for the centrifugal clutch 38. Thus, while at low and moderate speeds, the wheel cover 31 A will rotate unitarily with the wheel 17A, at higher speeds above the preset speed, where driving the wheel cover at high rotational velocities could be unsafe, the wheel cover will not be driven and can rotate at whatever speed its energy level dictates. Further, when the wheel stops and the clutch 38 re-engages, the wheel cover can continue to rotate in an attractive manner. While the sprag clutch is shown as an open construction for illustration purposes, it is understood that in actual production, it is contemplated that the clutch would be sealed from the elements in a well known conventional manner. While only preferred embodiments of this invention have been shown and described, it is understood that many changes therein can be made without departing from the scope of this invention as defined by the following claims.

What is claimed is:

1. A spinable wheel cover for connection to a vehicle wheel comprising,
   A) a driven wheel cover assembly including securable means for drivingly securing the same to a vehicle wheel,
   B) said wheel cover assembly also including a wheel cover and connecting means for drivingly connecting said cover to said securable means at such time as the latter is rotating in a forward direction and alternatively connecting said cover to said securable means for relative rotation,
   C) said connecting means including an inner race drivingly connected to said securable means, an outer race drivingly connected to said wheel cover, and a plurality of sprags disposed between said races, whereby said connecting mean alternately functions as a clutch and as a rotative connection, and including bearing means connecting said inner race to said securable means and a speed sensitive clutch operatively disposed between said securing means and said inner race.

2. A spinable wheel cover for connecting to a vehicle wheel comprising,
   A) a driven wheel cover assembly including securable means for drivingly securing the same to a vehicle wheel, a wheel cover and connecting means for connecting said cover to said securing means,
   B) said connecting means including a one way clutch drivingly connected to said wheel cover and a speed sensitive clutch for drivingly connecting said one way clutch to said securing means for unitary rotation.

3. A spinable wheel cover according to claim 2 wherein said one way clutch is a sprag clutch having an inner and an outer race with said outer race being drivingly connected to said wheel cover and said inner race being clutchable to said securing means by said speed sensitive clutch.

4. A spinable wheel cover according to claim 3 including bearing means rotatable mounting said inner race relative to said securing means.

\* \* \* \* \*